July 21, 1970 A. J. LEY 3,521,185

GENERATION OF BINOMIALLY DISTRIBUTED
PSEUDO-RANDOM ELECTRICAL SIGNALS

Filed Sept. 16, 1968 2 Sheets-Sheet 1

INVENTOR
ANTHONY JOHN LEY
BY J M Prisson
ATTORNEY

United States Patent Office 3,521,185

Patented July 21, 1970

3,521,185

GENERATION OF BINOMIALLY DISTURBED PSEUDO-RANDOM ELECTRICAL SIGNALS

Anthony John Ley, Farnborough, England, assignor to The Solartron Electronic Group Limited, Farnborough, England, a corporation of the United Kingdom Filed Sept. 16, 1968, Ser. No. 759,937

Claims priority, application Great Britain, Sept. 18, 1967, 42,450/67

Int. Cl. H03b *19/00, 29/00*

U.S. Cl. 331—78 7 Claims

ABSTRACT OF THE DISCLOSURE

Apparatus for generating a binomially distributed pseudo-random electrical signal comprises a store such as a shift register with a feedback loop connected so as to generate a chain code, and a circuit which detects the states of two or more stages of the store and in response to one combination of states adds one bit to a counter and in response to another combination subtracts one bit from the counter, the output signal being proportional to the number stored in the counter.

This invention relates to the generation of an electrical signal which has a characteristic which so sequentially takes one of a plurality of predetermined values that the overall number of times that the output signal takes each value is binomially distributed. If such a signal is repeatedly generated, it is known as a binomially-distributed pseudo-random signal.

One known type of random signal is the random telegraph signal. This signal is divided into equal time intervals and for each interval the signal takes in a random manner one of two possible values. If a finite sequence of intervals is continuously repeated, the resultant signal is known as a pseudo-random telegraph signal, or chain code.

One chain-code generator producing a maximal-length sequence has been described by Briggs et al. in Proc. Instn. Mech. Engrs., 1964–65, Vol. 179, Pt. 3H, pages 37–51. The generator consists of a shift register (or a digital filter), each successive input value of which is automaticcally determined by the values of predetermined ones of the stages of the shift register. Depending on which stages are used to determine the input value, a maximal-length sequence may be generated at the output of the register, during which the shift register adopts every possible state, except the state where all the stages are zero, before repeating itself. For a register having $m$ stages, a maximal-length sequence occupies $2^m—1$ time intervals.

For certain purposes, such as testing non-linear systems it is useful to have a source for generating a signal the value of which so sequentially takes one of a plurality of predetermined values that the overall number of times that the signal takes each value is binomially distributed. This is different from the telegraph signal, in that the signal takes $n+1$ different values, and the $p^{th}$ value occurs $$\frac{n!}{p!\,(n-p)!}$$

times in a sequence. This number is the coefficient of $x^p$ in the binominal expansion of $(1+x)^n$, from which the binomially distributed signal derives its name.

This invention provides apparatus for generating an electrical output signal which has a characteristic which sequentially takes one of a plurality of predetermined values so that the overall number of times that the output signal takes each value is binomially distributed. The apparatus comprises storage means consisting of a number of stages connected in cascade so that an input signal applied to the input of the first stage is stored for a predetermined time by each stage in succession. A feedback loop connects at least two of the stages to the input of the first stage so that the storage means generates a chain code. A detecting circuit is connected to detect the states of at least two stages and provide at least a first electrical signal in response to one combination of the states and a second electrical signal in response to another combination of the states. The apparatus further includes a reversible counter connected to receive the first and second signals and arranged so that the first signal adds a number to the number stored in the counter and the second signal subtracts a number from the number stored in the counter, and includes means for generating an electrical output signal having a characteristic dependent on the number stored in the counter. The storage may conveniently be a shift register.

Certain embodiments of the invention will now bedescribed, by way of example, with reference to the accompanying drawings, in which.

Figures 1, 2:
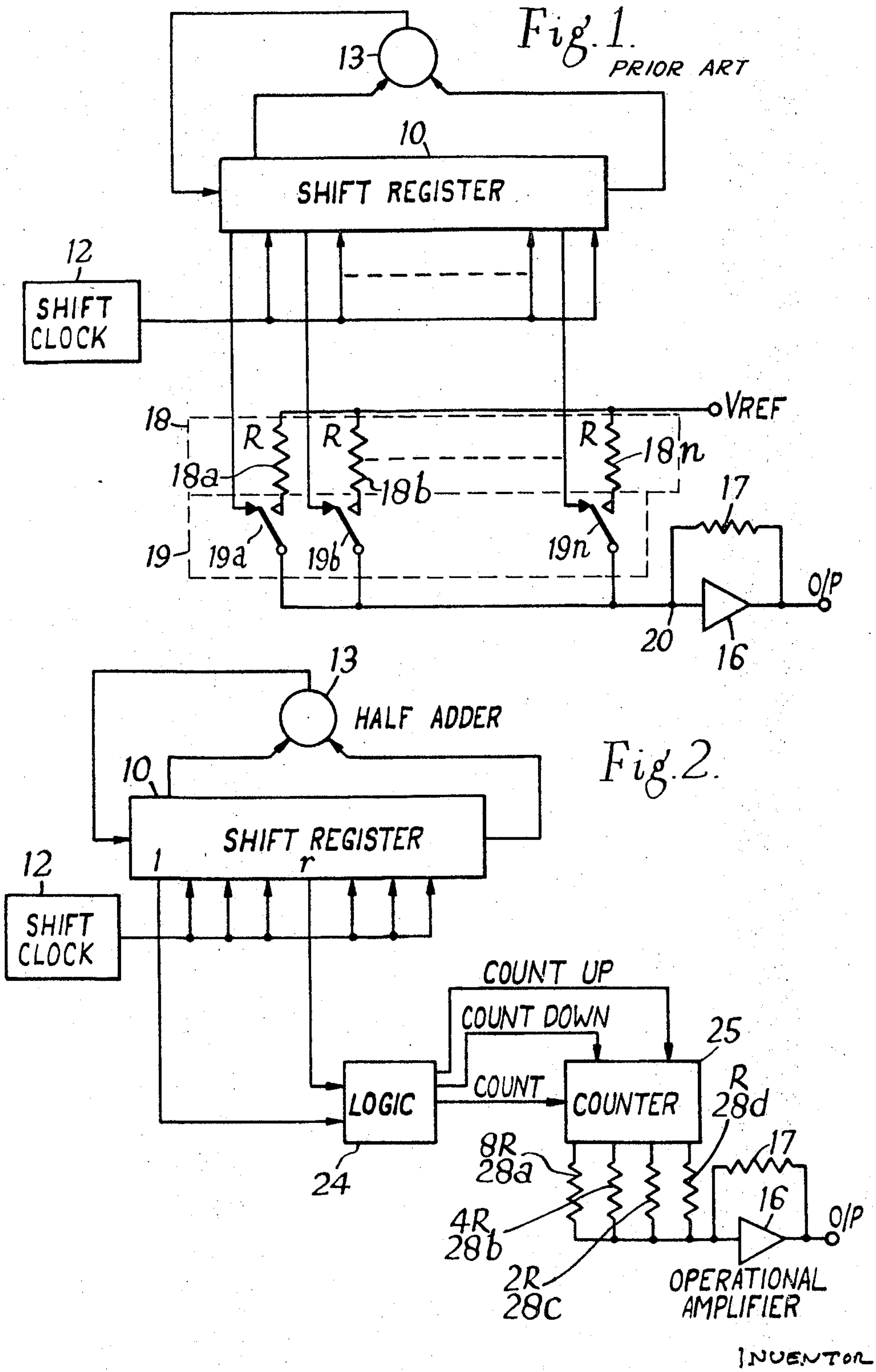
FIG. 1 is a block diagram of the circuit of a known pseudo-random signal generator.
FIG. 2 is a block diagram of the circuit of a pseudo-random signal generator embodying the invention.

FIG. 1 illustrates a known generator for generating a binominally-distributed pseudo-random signal. The generator has a shift register 10 which is made up of a number $n$ of stages arranged in cascade. Each stage stores either a "0" digit or a "1" digit. A shift clock 12 is connected to all the stages, and periodically moves the digit stored by each stage into the next following stage. The input to the first stage is determined by the state of the first and last stages. The first and last stages are both connected to a half adder 13 which adds the digits in the first and last stages according to modulo 2, i.e. $0+0=0$, $1+0=1$ and $1+1=0$. The output of the half adder 13 constitutes the input of the first stage of the register.

Each stage has associated with it a switch 19 which closes when the corresponding stage contains a 1 and opens when it contains a 0. When closed, each of the switches 19$a$ to 19$n$ connects a corresponding resistor 18 between a source of constant potential $V_{REF}$ and the summing junction 20 of a summing amplifier 16. The resistors 18$a$ to 18$n$ are all precision resistors of the same value R. Thus for $n+1$ values of the output signal $n$ switches 19 and precision resistors 18 are required.

The generator shown in FIG. 2 has a shift register 10, a shift clock 12 and a half adder 13 which are as in the generator shown in FIG. 1 and described above. The shift register 10 constitutes storage means and consists of a number of stages so connected in cascade that an input signal applied to the input of the first stage is stored for a predetermined time controlled by the clock 12 in each stage in succession. A feedback loop connects two of the stages of the register to the input of the register so that the register continuously generates a repeated chain code. Provided certain conditions are observed, as set out in the aforementioned Briggs reference, the register will generate a maximal length chain code, that is a code which repeats itself only after $2^n-1$ digits, where there are $n$ stages in the register.

A logic or detecting circuit 24 is connected to any two of the stages of the register, in this case stages 1 and $r$. Each stage provides two complementary outputs; Q1 and $\overline{Q1}$ from stage 1, and $Qr$ and $\overline{Qr}$ from stage $r$. Since in a maximal-length sequence the register adopts all possible arrangements except the state where all the stages contain a zero, any two stages takes up all four of the possible combinations of the two stages, i.e. 0, 0; 1, 0; 0, 1; and 1, 1, an equal number of times except for the 0, 0 state corresponding to the state where all the stages in the register contain zeros.

The logic circuit 24 is arranged to provide three outputs, a COUNT UP output corresponding to the 1, 0 state of the two selected stages, a COUNT DOWN output corresponding to the 0, 1 state of the two stages and a COUNT output corresponding to both the 1, 0 and 0, 1 states.

Figure 3:
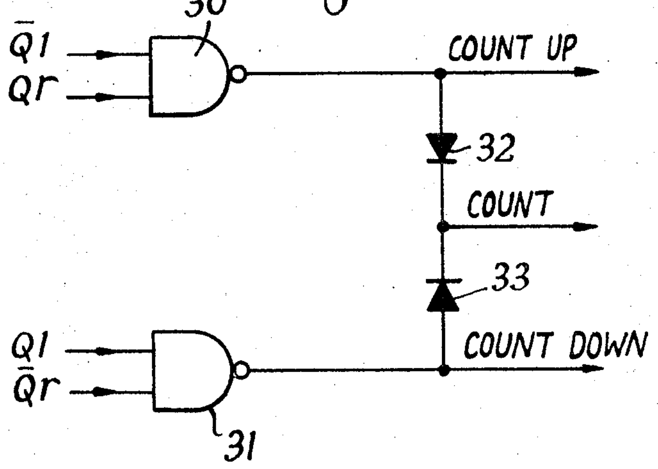
FIG. 3 is a diagram of the logic circuit of the generator of FIG. 2.

The outputs $\overline{Q1}$ and $Qr$ are connected to a first NOR gate 30 (FIG. 3) and the outputs Q1 and $\overline{Qr}$ are connected to a second NOR gate 31. Two diodes 32 and 33 are connected so that a signal at the output of either gate provides a COUNT output, while the output of gate 30 provides the COUNT UP output and the output of gate 31 provides the COUNT DOWN output.

The logical result of the connections may be written:

COUNT UP=Q1. $\overline{Qr}$
COUNT DOWN=$\overline{Q1}$. $Qr$
COUNT=(COUNT UP)+(COUNT DOWN)

A reversible counter 25 receives the outputs of the logic circuit 24. A COUNT UP signal adds one unit to the number stored in the counter, and a COUNT DOWN signal substracts one unit from the number stored in the counter.

A suitable reversible counter is the binary counter using flip-flops described in Computer Handbook, by Husky & Korn, McGraw-Hill Inc., 1962, pages 18–34 and shown therein Fig. 18.54. In using the counter the feedback device labelled "D.C. trigger pair" is omitted and is replaced by the logic circuit 24 which provides the two outputs COUNT UP and COUNT DOWN over the lines shown as connected to the output of the D.C. trigger pair. The signal COUNT is applied to the input C.

In FIG. 2 the counter 25 is a binary counter such as described in the above mentioned Husky and Korn reference, and has connected to the output of the stages of the counter binary weighted resistors 28*a* to 28*d*. When a stage of the binary counter contains a binary 1, the corresponding resistor 28 is connected to a source of constant potential. The resistors are all connected to a summing amplifier 16. Since the resistors have values increasing by factor 2, a smaller number of precision resistors can be employed, and this represents a considerable advantage over the generator shown in FIG. 1. The output of the summing amplifier 16 will be a varying signal having a value dependent upon the number stored in the reversible counter 25.

It is important that for the most efficient use of the register the counter is capable of handling the number of values of the output signal required. A shift register of $n$ stages can generate $n+1$ different values of the output signal, and a counter of $m$ stages should be used where $2^m \geqslant n+1$. If the counter can handle less values than can be produced by the shift register, then the number of values of the output signal obtainable is $2^m$.

In the embodiment shown in FIG. 2, a 4-stage counter, capable of handling 16 levels, is used with an 8-stage shift register, producing 9 levels.

Figure 4:
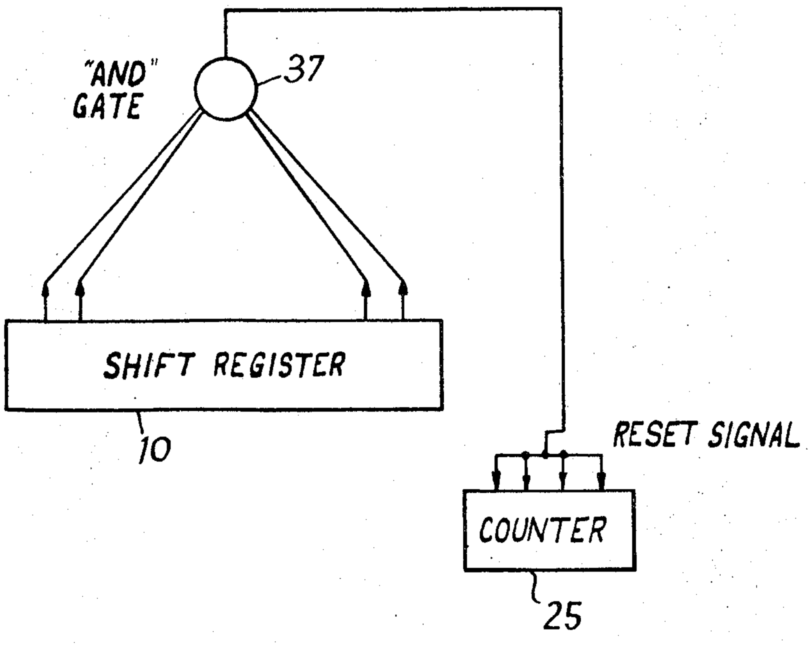
FIG. 4 is a diagram of a modification applicable to the generator of FIG. 2.

It is sometimes useful to ensure that the stages of the counter and of the register correspond throughout usage. They may deviate after switching on or off, of if a spurious pulse is registered by the counter. FIG. 4 shows a circuit which may be added to the circuit of FIG. 2 to check once in every sequence that the counter and register correspond. An AND gate 37 is connected to each stage of the register so as to produce an output only for one state of the register during a sequence, for example the state where all the stages contain ones. This output of the AND gate is applied to the counter 25 and sets it to a predetermined state, say zero regardless of the previous state of the counter and the output of the logic circuit 24. One sequence later the counter will have received, in the absence of spurious or missed counts, an equal number of COUNT UP and COUNT DOWN signals, and will again be at zero. Thus, after one full sequence the overriding logic of the AND gate 37 only corrects any errors or discrepancies.

Various modifications to the generator shown in FIG. 2 are possible. The shift clock 12 may be adjustable over a range of frequencies, to vary the frequency of change of the output signal. Switches may be provided to temporarily remove one or more stages from the shift register and thus to generate a different but shorter sequence. The amplifier 16 can be adjustable so that the range of values adopted by the output signal is variable, and a constant bias may be provided to change the output value corresponding to the mean value of the range.

I claim:

1. Apparatus for generating an electrical output signal which has a characteristic which so sequentially takes one of a plurality of predetermined values that the overall number of times that the output signal takes each value is binomially distributed, said apparatus comprising:

storage means including a plurality of stages connected in cascade and having an input;

a feedback loop connecting at least two of said storage means stages to said storage means input, whereby said storage means generates a chain code;

a detecting circuit connected to at least two of said storage means stages to detect the states of said stages, said detecting circuit including means for providing at least a first electrical signal in response to one combination of said states and a second electrical signal in response to another combination of said states;

a reversible counter connected to said detecting circuit to receive said first and second signals, whereby said first signal adds a number to the number stored in said counter and said second signal subtracts a number from the number stored in said counter; and means connected to said counter for generating an electrical output signal having a characteristic dependent of the number stored in said counter.

2. Apparatus as claimed in claim 1, wherein said storage means comprises a clocked shift register.

3. Apparatus as claimed in claim 1, wherein said feedback loop comprises a half-adder having inputs connected respectively to two of said storage means stages and an output connected to said storage means input.

4. Apparatus as claimed in claim 1, wherein said counter is a binary counter.

5. Apparatus as claimed in claim 4, wherein said generating means comprises:

binary weighted resistors associated with the stages of said counter;

a source of constant potential;

a summing amplifier having an output connected to the output of said apparatus; and means connecting each resistor between said potential source and said amplifier only when the respective counter stage is in one of its two states.

6. Apparatus as claimed in claim 1, further comprising a coincidence gate having inputs connected to all the storage means stages and an output connected to a reset input of said counter.

7. Apparatus as claimed in claim 5, further comprising an AND gate connected to said storage means to provide an output only for one predetermined state of said storage means, said AND gate having an output connected to said counter to reset said counter to a predetermined state.

References Cited

Buron et al., "Noise Generated by Digital Technique," IBM Technical Disclosure Bulletin, vol. 8, No. 9, February 1966 p. 1232.

Kramer, "A Low-Frequency Pseudo-Random Noise Generator," Electronic Engineering, July 1965, pp. 465–467.

ROY LAKE, Primary Examiner

S. H. GRIMM, Assistant Examiner

U.S. Cl. X.R.

328—37, 59, 63